US007655169B2

(12) United States Patent
Goto

(10) Patent No.: US 7,655,169 B2

(45) Date of Patent: Feb. 2, 2010

(54) METAL MOLD FOR MANUFACTURING A DEVELOPING BLADE

(75) Inventor: Taihei Goto, Kanagawa (JP)

(73) Assignee: Kabushiki Kaisha Bridgestone, Tokyo (JP)

(*) Notice: Subject to any disclaimer, the term of this patent is extended or adjusted under 35 U.S.C. 154(b) by 713 days.

(21) Appl. No.: 11/149,219

(22) Filed: Jun. 10, 2005

(65) Prior Publication Data

US 2006/0277743 A1 Dec. 14, 2006

(51) Int. Cl.
*B29C 45/14* (2006.01)

(52) U.S. Cl. ..................... 264/259; 425/127; 425/129.1

(58) Field of Classification Search ................. 425/116, 425/127, 129.1; 264/259
See application file for complete search history.

(56) References Cited

U.S. PATENT DOCUMENTS

2006/0267227 A1* 11/2006 Goto ........................... 264/35
2007/0114357 A1* 5/2007 Goto ........................... 249/83
2008/0145662 A1* 6/2008 Nakamura et al. .......... 428/409

FOREIGN PATENT DOCUMENTS

JP 2001198945 A * 7/2001
JP 2004148603 A * 5/2004
JP 2004-163615 A 6/2004
JP 2005246957 A * 9/2005

OTHER PUBLICATIONS

Partial machine translation of JP2004-148603A dated May 2004 obtained from the JPO website.*

* cited by examiner

*Primary Examiner*—Robert B Davis
(74) *Attorney, Agent, or Firm*—Sughrue Mion, PLLC

(57) ABSTRACT

A developing blade 10 is insert molded by forming a rib portion 13 which projects from an end portion in the longitudinal direction of a blade body 12 in the transverse direction of the blade body 12, opposite to the contact surface 12*a* side of the blade body 12, on the blade body 12 in contact with the developing roll of the developing blade 10 and forming the gate 21G of a metal mold 20 in which a metal plate 11 as an insert member has been installed only in a cavity 21*b* corresponding to the above rib portion 13. Therefore, a developing blade 10 without burrs and recesses on its contact surface with the developing roll or without welds can be easily manufactured.

6 Claims, 8 Drawing Sheets

12
13
10
12a
21G
11
21d
12b 20
21
21G
21G
21d
21b
21b
A
A
21C
21C
21a
21a
21c
21c
22C
22C
23
23a
24
24a
24b

METAL MOLD FOR MANUFACTURING A DEVELOPING BLADE

BACKGROUND OF THE INVENTION

1. Field of the Invention

The present invention relates to a process for manufacturing a developing blade for use in the developing device of a copier such as a laser printer and a metal mold for a developing blade.

2. Description of the Prior Art

Heretofore, in an electrophotographic copier or a copier such as a laser printer, an electrostatic latent image is formed on a photosensitive drum, toner is adhered to this electrostatic latent image by a developing device to visualize it, and this image is transferred to a recording medium such as paper to form an image.

FIG. 7 shows the outline of a developing device of the prior art. In this developing device 50, toner 52 is contained in a housing 51 as a developer and supplied to the surface of a developing roll 55 by means of a toner feed roll 54 while it is stirred by a stirrer 53. The toner 52 supplied to the surface of the above developing roll 55 is controlled to become a uniform thin layer by a developing blade 30 while the developing roll 55 is turned and friction charged to be limited to a predetermined film thickness, and this friction charged toner 52 is carried to a developing area opposite to the above developing roll 55 of the photosensitive drum 56 to be adhered to an electrostatic latent image formed on the surface of the above photosensitive drum 56.

FIG. 8 shows an example of the developing blade of the above prior art. This developing blade 30 is a prolonged member comprising a metal plate 31 which is a plate spring as a support member having one end fixed to the above housing 51 and a blade body 32 which is made of an elastic material such as urethane or rubber, has a projecting sectional form and sandwiches the other end of the metal plate 31. The developing blade 30 is generally manufactured by insert molding using the above metal plate 31 as an insert member.

FIGS. 9(*a*) and 9(*b*) show an example of the process for manufacturing a developing blade of the prior art. This developing blade 30 is manufactured by installing the prolonged metal plate 31 shown in FIG. 9(*b*) as an insert member in the cavity 43 of a metal mold 40 for forming the blade body 32, which consists of a fixed mold 41 and a movable mold 42, in such a manner that its short side projects into the above cavity 43, introducing a rubber material or resin material injected from an unshown injection device into the above cavity 43 from a large number of gates 44 formed above a portion corresponding to the blade body 32 of the above cavity 43 to transfer mold it and solidifying it (refer to patent document 1, for example).

As for the process for manufacturing a developing blade, as shown in FIG. 10, there is proposed a process in which a tab portion 33 extending in the longitudinal direction of the above blade body 32 is formed at the end in the longitudinal direction of the blade body 32 and the gate 45 of an unshown hot runner is formed in this tab portion 33 as a gate for injecting a resin. Thereby, the blade body 32 having a smooth surface can be manufactured by removing the surface distortion of the blade body 32 (refer to patent document 2, for example).

[patent document 1] JP-A 11-231647 (the term "JP-A" as used herein means an "unexamined published Japanese patent application")

[patent document 2] JP-A 2001-42639

SUMMARY OF THE INVENTION

However, when the gates 44 are formed in the portion corresponding to the above blade body 32, as the molding material is directly injected into the cavity 43 for forming the blade body 32 from the above gates 44, linear level differences 32*x* called "welds" extending in the transverse direction of the blade body 32 may be formed in the vicinity of the above gates 44 of the molded blade 30A as shown in FIG. 11. When the above level differences 32*x* larger than a predetermined value are existent in a portion in contact with the developing roll 55 of the blade body 32, contact between the developing roll 55 and the developing blade 30A worsens, and the toner 52 does not become uniform in thickness, whereby vertical streaks are formed on an image with the result that a high-quality image is not obtained.

Since the above gate 45 is adjacent to the contact side with the developing roll of the blade body 32 and the injection direction of the molding material is the longitudinal direction of the above blade body 32 even when the gate 45 of the hot runner is formed in the tab portion 33 extending in the longitudinal direction of the blade body 32 as a gate for injecting a resin, as shown in FIG. 12, the molded blade 30B has a problem that burrs and recesses are easily produced on the contact surface with the developing roll of the blade body 32.

It is an object of the present invention to provide a process for manufacturing a developing blade without burrs and recesses on its contact surface with the developing roll or without welds and a metal mold used for the injection molding of the above developing blade.

The inventors of the present invention have conducted intensive studies and have found that a developing blade without burrs and recesses on its contact surface with the developing roll or without welds can be manufactured by forming a rib portion projecting in the transverse direction of the above blade body from one end portion on a side opposite to the contact surface side with the developing roll of the blade body, particularly the end portion in the longitudinal direction and forming a gate only in the above rib portion to inject a molding material into a cavity for forming the above blade body. The present invention has been accomplished based on this finding.

According to a first aspect of the present invention, there is provided a process for manufacturing a developing blade comprising a rib portion which projects from an end portion in the longitudinal direction of a blade body in the transverse direction of the blade body, opposite to the contact surface side of the blade body (upward direction in the plan view of the developing blade shown in FIG. 1(*a*)), on the blade body in contact with the developing roll of the developing blade, wherein a gate is formed only in a portion corresponding to the rib portion of a metal mold and a molding material is injected into the metal mold from the gate to manufacture the developing blade.

According to a second aspect of the present invention, there is provided a process for manufacturing a developing blade, wherein the molding material is injected into the metal mold to manufacture the developing blade.

According to a third aspect of the present invention, there is provided a process for manufacturing a developing blade, wherein an insert member composed of a metal plate is installed in the metal mold to insert mold the developing blade.

According to a fourth aspect of the present invention, there is provided a metal mold for molding a developing blade, comprising at least one pair of mold members and a cavity for injection molding a developing blade having a rib portion which projects from an end portion in the longitudinal direction of a blade body in the transverse direction of the blade body, opposite to the contact surface side of the blade body, on the blade body in contact with the developing roll of the developing blade, wherein the gate of the metal mold is formed only in a portion corresponding to the rib portion of the cavity.

According to a fifth aspect of the present invention, there is provided a metal mold for molding a developing blade, wherein the thickness of the rib portion is 20 to 80% of the thickness of the blade body.

According to a sixth aspect of the present invention, there is provided a metal mold for molding a developing blade, wherein the length in the transverse direction of the rib portion is 10 to 200% of the length in the transverse direction of the blade body.

According to a seventh aspect of the present invention, there is provided a metal mold for molding a developing blade, wherein means of holding an insert member composed of a metal plate is installed in the metal mold to insert mold a developing blade having the metal plate as a support member.

According to the present invention, a rib portion which projects from an end portion in the longitudinal direction of a blade body in the transverse direction of the above blade body, opposite to the contact surface side of the blade body, is formed on the blade body in contact with the developing roll of the developing blade, a gate is formed only in a portion corresponding to the above rib portion of a metal mold for molding a developing blade at a position away from the contact surface with the developing roll of the blade body, and a molding material is injected into the metal mold from this gate to manufacture the above developing blade. Therefore, a developing blade without burrs and recesses on its contact surface with the developing roll or without welds can be easily manufactured.

DETAILED DESCRIPTION OF THE PREFERRED EMBODIMENT

A preferred embodiment of the present invention will be described in detail hereinunder with reference to the accompanying drawings.

Figure 1A:
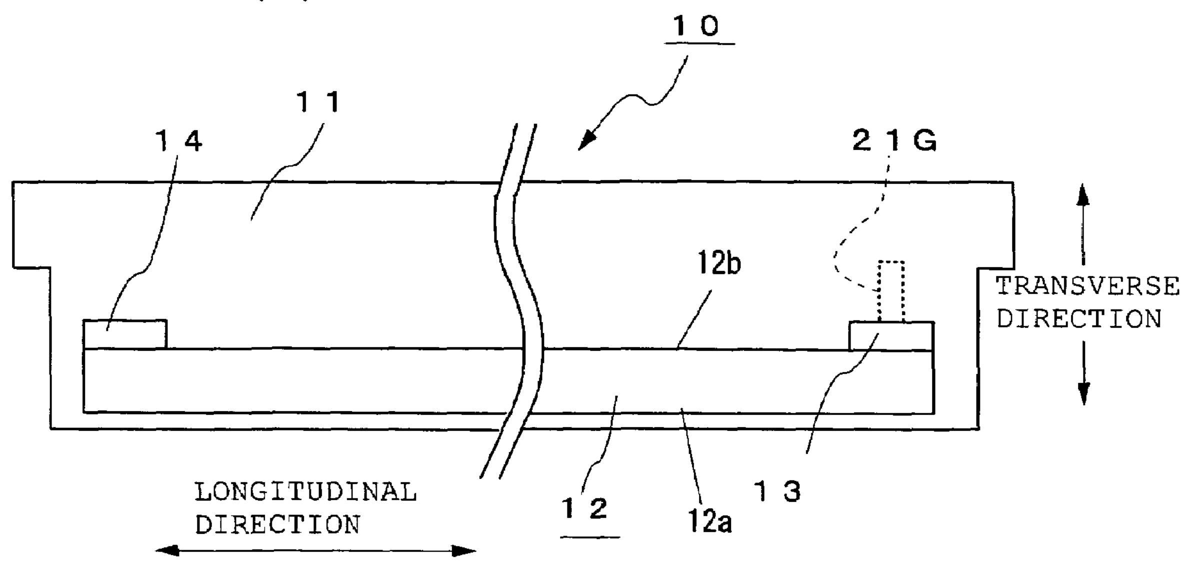
FIGS. 1(*a*) and 1(*b*) are diagrams of a developing blade according to this embodiment.
Figure 1B:
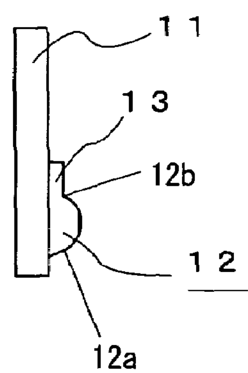

FIGS. 1(*a*) and 1(*b*) are a plan view and a side view of a developing blade 10 according to an embodiment of the present invention, respectively. The developing blade 10 of this embodiment comprises a metal plate 11 having spring elasticity as a support member, a blade body 12 in contact with a developing roll, and first and second rib portions 13 and 14 which project in the transverse direction of the above developing blade 10 and are formed on both end portion in the longitudinal direction of the above developing blade 10 on the rear side 12*b* of the blade body 12 opposite to the above contact surface 12*a* side of the above blade body 12. The developing blade 10 is manufactured by injection molding (insert molding) using the above metal plate 11 as an insert member.

Figure 2:
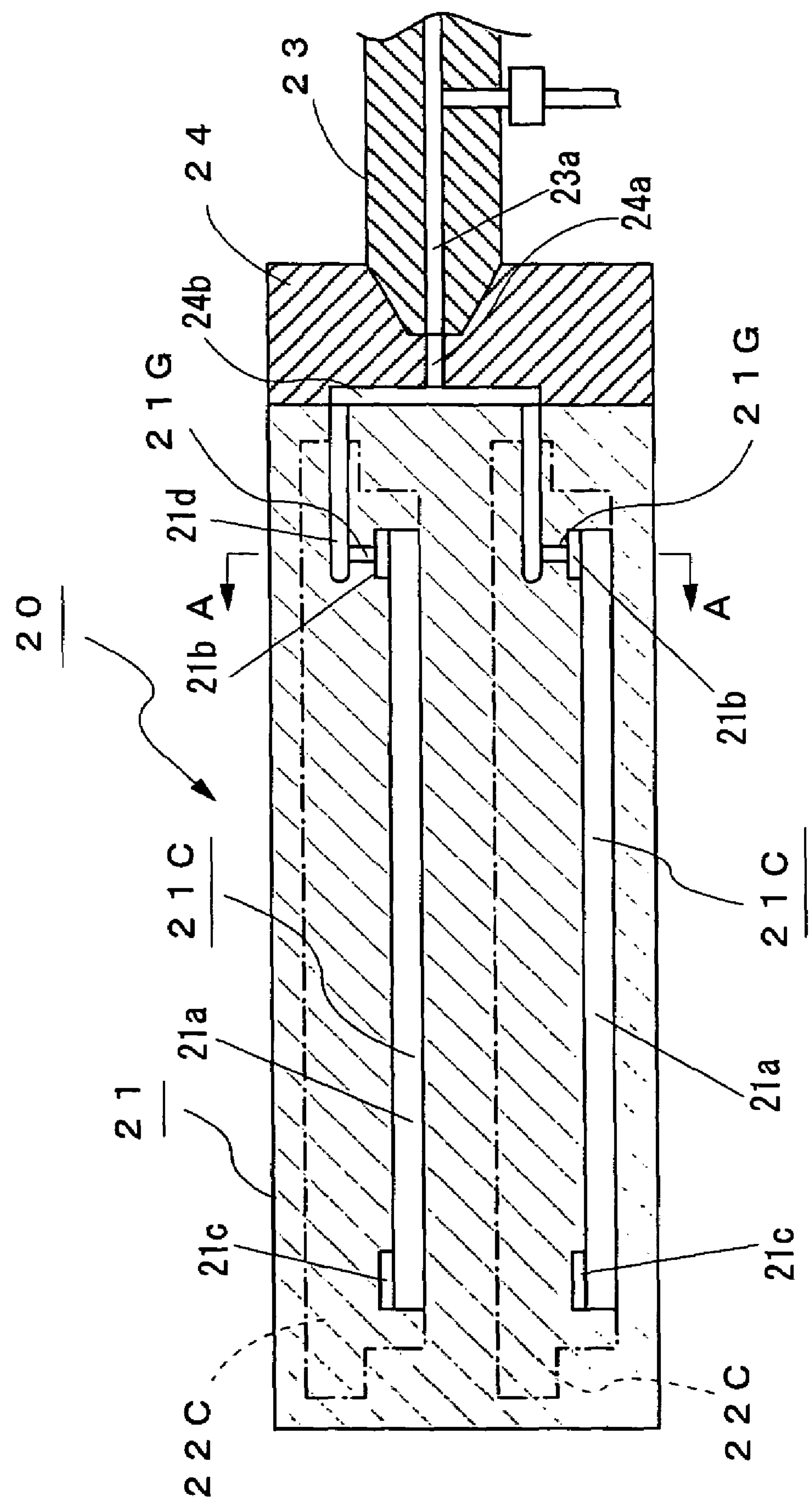
FIG. 2 is a sectional view of a metal mold for the developing blade of this embodiment.
Figure 3:
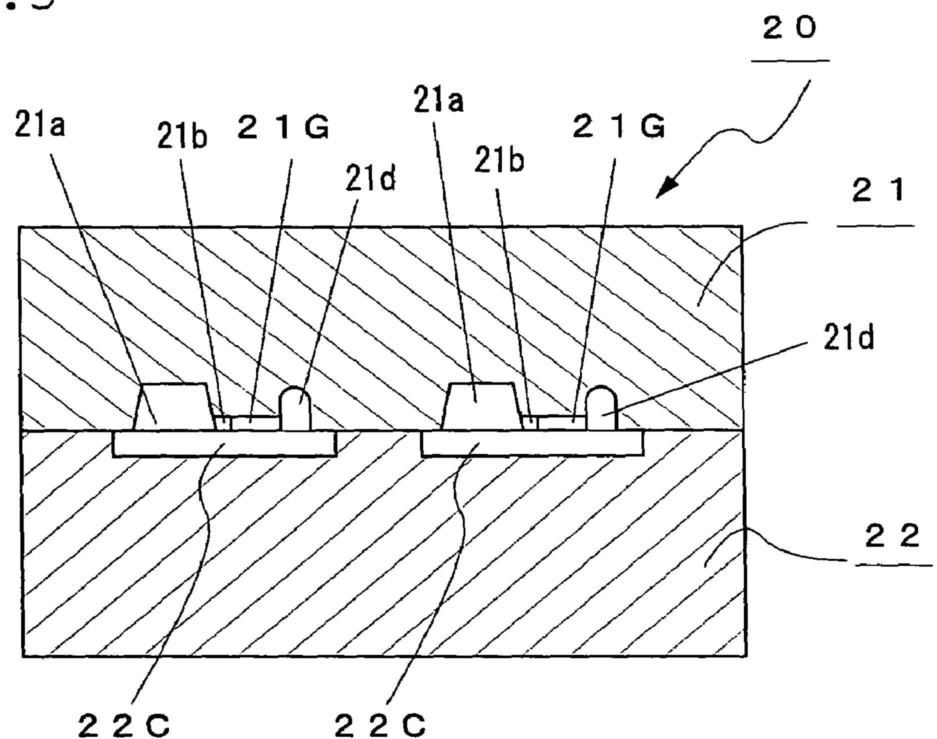
FIG. 3 is a sectional view cut on A-A of FIG. 2.

FIG. 2 is a sectional view of a metal mold 20 (injection mold) for injection molding two of the above developing blades 10, and FIG. 3 is a sectional view cut on A-A of FIG. 2. The metal mold 20 comprises a main mold 21 having cavities 21C for molding the above blade body 12 and the first and second rib portions 13 and 14, sprues 21*d* and gates 21G for introducing a molding material into the cavities 21C, an insert mold 22 having recessed portions 22C for storing the metal plate 11 as an insert member, and a sprue plate 24 having a sprue 24*a* and a runner 24*b* for letting the molding material injected from an injection head 23 pass therethrough. Each of the above cavities 21C includes a cavity 21*a* for forming the above blade body 12 and cavities 21*b* and 21*c* for forming the above first and second rib portions 13 and 14, respectively. The molding material delivered from the above injection head 23 is injected into the above cavity 21C from the sprue 21*d* communicating with the runner 24*b* of the above sprue plate 24 through the gate 21G formed in the cavity 21*b* for forming the above first rib portion 13 to mold the above developing blade 10.

At this point, it is important that the gate 21G should be formed only in the above cavity 21*b*, whereby the molding material can be smoothly injected into the cavity 21*a* for forming the blade body 12.

The second rib portion 14 is formed on the above blade body 12 in consideration of the symmetry of the developing blade 10. Although the second rib portion 14 is not always necessary, as the cavity 21*c* for forming the above second rib portion 14 also has the function of storing an excess of the resin material which has reached the end of the cavity 21*a* for forming the blade body 12, the blade body 12 can be manufactured more accurately by forming the second rib portion 14.

Figure 4:
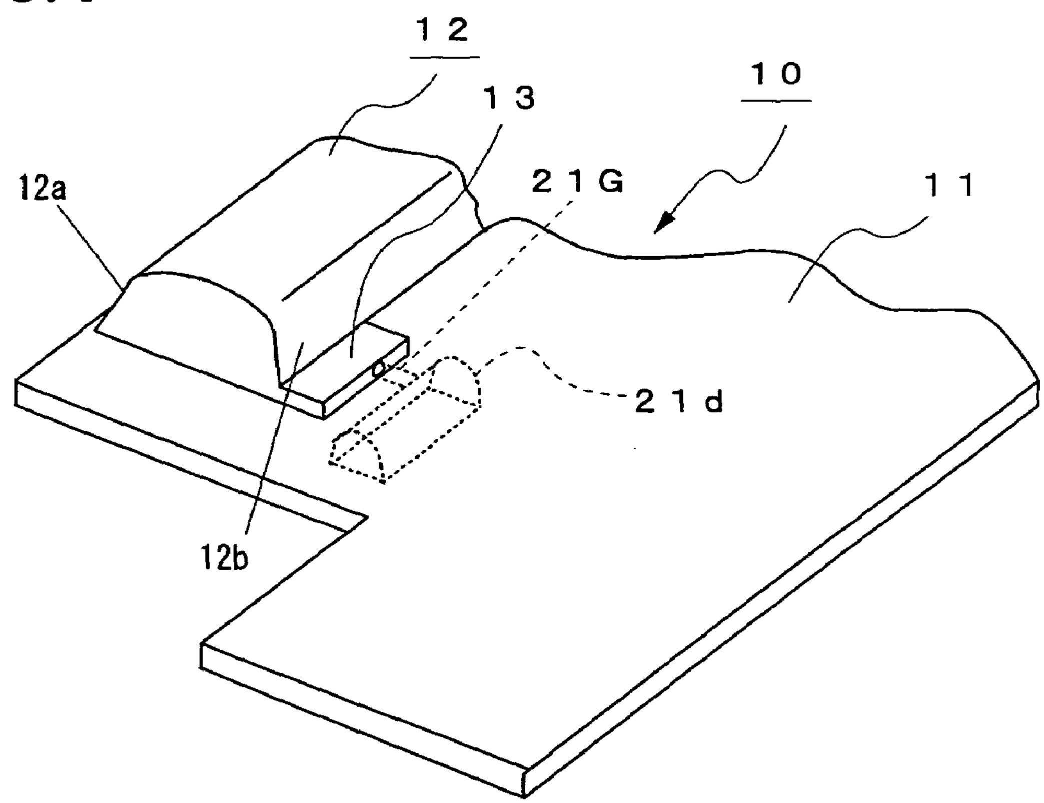
FIG. 4 is a diagram showing a process for manufacturing the developing blade of this embodiment.

In this embodiment, as shown in FIG. 4, the gate 21G of the above mold 20 is formed on the side surface side of the cavity 21*b* corresponding to the first rib portion 13 so that the molding material such as silicone rubber pressure fed from the injection head 23 through the sprue 24*a* and runner 24*b* of the sprue plate 24 is introduced into the above cavities 21*a* to 21*c* from the sprue 21*d* of the above main mold 21 through the above gate 21G to be solidified so as to form the developing blade 10 having the above constitution. The gate 21G of the metal mold 20 is formed not on the blade body 12 side but the rib portion 13 side which projects from the end portion in the longitudinal direction of the above blade body 12 in the transverse direction of the above blade body 12, opposite to the above contact surface 12*a* side of the above blade body 12 so that it is away from the cavity 21*a* corresponding to the blade body 12, and the number of injection positions is one. Therefore, a developing blade 10 without burrs and recesses on the blade body 12 in contact with the developing roll or without welds can be manufactured.

Figure 5:
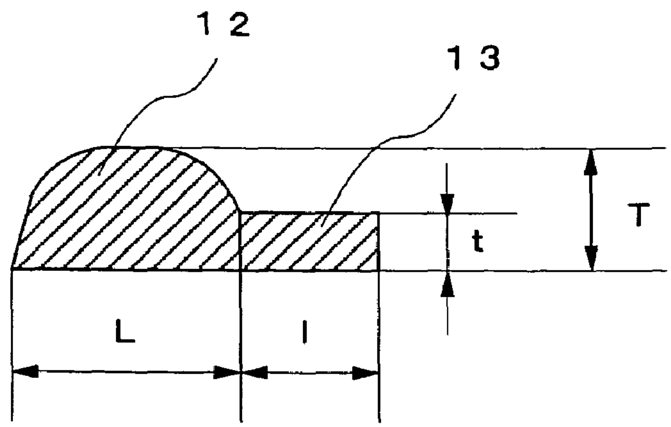
FIG. 5 is a diagram showing the size and shape of a blade body of this embodiment.

As for the size of the above rib portion 13, as shown in FIG. 5, the thickness “t” of the above rib portion 13 is preferably 20 to 80%, particularly preferably around 50% of the thickness “T” of the blade body 12. When the above thickness “t” is smaller than 20% of the thickness “T” of the blade body 12, the cavity 21*b* corresponding to the above rib portion 13 becomes small, thereby making it impossible to fill the molding material into the cavity 21*a* for forming the blade body 12 completely. As a result, burrs and recesses are readily produced on the blade body 12. When the above thickness "t" is larger than 80% of the thickness "T" of the blade body 12, the level difference between the rib portion 13 and the blade body 12 becomes small, whereby welds are readily produced at a position close to the gate 21G of the blade body 12.

The length "l" of the above rib portion 13 is preferably 10 to 200%, particularly preferably around 20% of the length "L" in the transverse direction of the blade body 12. When the above length "l" is smaller than 10% of the length "L" of the blade body 12, the gate 21G becomes too close to the cavity 21*a* corresponding to the blade body 12, whereby welds are readily produced in the vicinity of the above gate 21G of the blade body 12. When the above length "l" is larger than 200%, the passage of the molding material becomes too long, thereby making it difficult to fill the molding material. As a result, burrs and recesses are readily produced on the blade body 12. Therefore, the above length "l" is preferably 10 to 200% of the above length "L".

According to this embodiment, the rib portion 13 which projects from the end portion in the longitudinal direction of the above blade body 12 in the transverse direction of the above blade body 12, opposite to the above contact surface 12*a* side of the above blade body 12, is formed on the blade body 12 in contact with the developing roll of the developing blade 10, and the above gate 21G of the metal mold 20 comprising the main mold 21 having the cavity 21C (21*a* to 21*c*) for molding the above blade body 12 and the first and second rib portions 13 and 14 and the sprue 21*d* and the gate 21G for introducing the molding material into the above cavity 21C and the insert mold 22 having the recessed portion 22C for storing the metal plate 11 as an insert member is formed only in the cavity 21*b* corresponding to the above rib portion 13 to insert mold the above developing blade 10. Therefore, the developing blade 10 without burrs and recesses on its contact surface with the developing roll or without welds can be easily manufactured.

In the above embodiment, the gate 21G is formed on the side surface side of the cavity 21*b* for forming the above rib portion 13. The position of the gate is not limited to this. For instance, it may be formed not on the blade body 12 side but on the rib portion 13 side, for example, the top of the above cavity 21*b*.

Figure 9A:
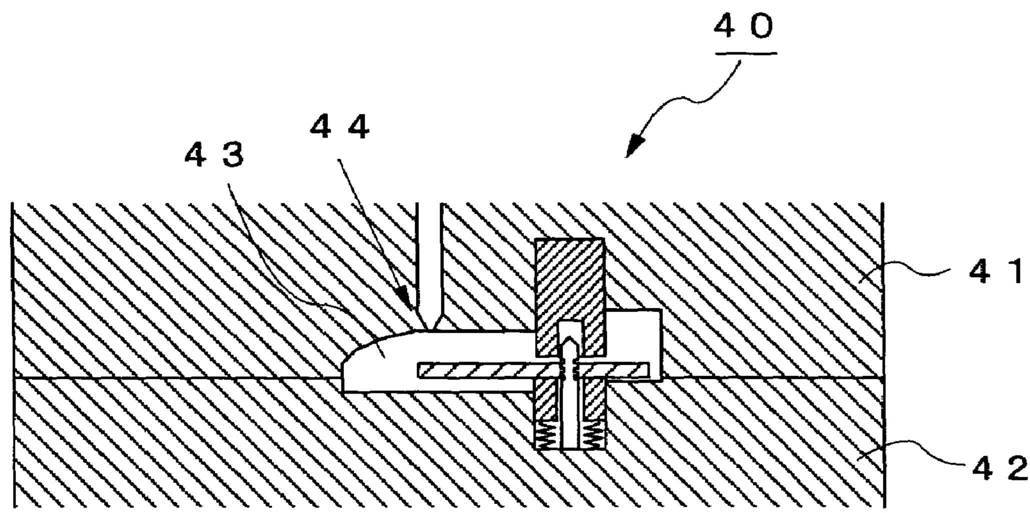
FIGS. 9(*a*) and 9(*b*) are diagrams showing a prior art process for manufacturing a developing blade.
Figure 9B:
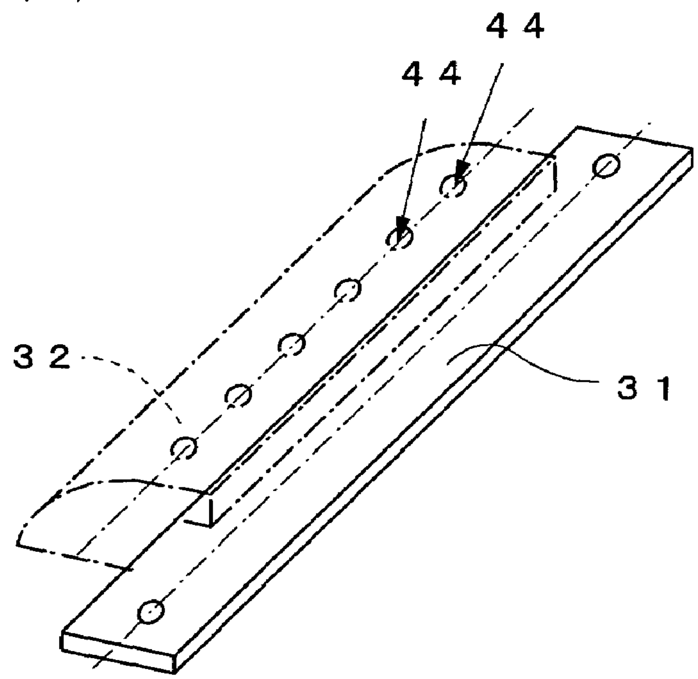
Figure 10:
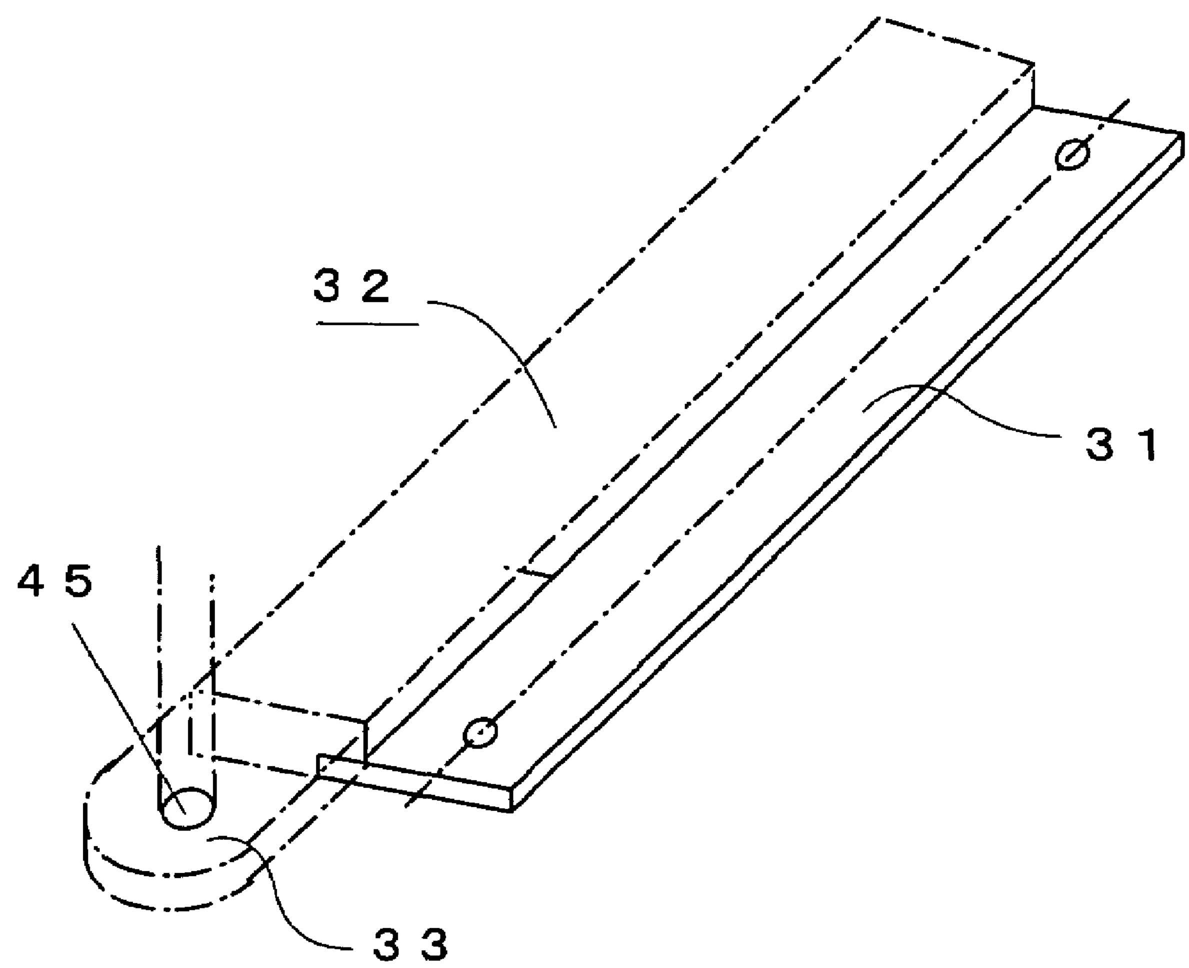
FIG. 10 is a diagram showing another prior art process for manufacturing a developing blade.
Figure 11:
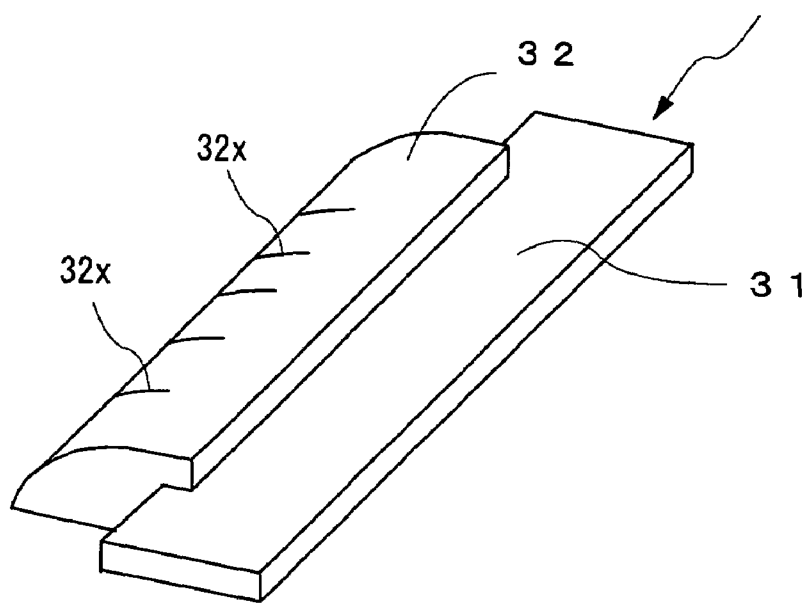
FIG. 11 is a diagram showing defective portions in the prior art manufacturing process.
Figure 12:
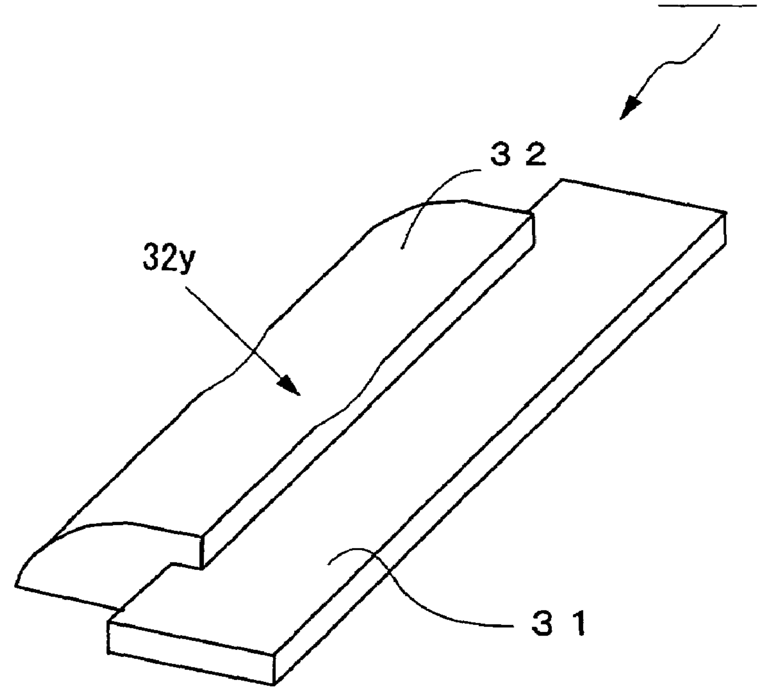
FIG. 12 is a diagram showing a defective portion in the another prior art manufacturing process.

In the above embodiment, the blade body 12 is held on the metal plate 11 of the developing blade 10. The present invention is not limited to this. For instance, as shown in FIG. 9(*b*) or FIG. 10, the present invention can be applied to a developing blade comprising a metal plate 31 which is sandwiched by a blade body 32.

The present invention is applicable not only to the above insert molding but also to a case where a developing blade is manufactured by injection molding only the blade body 12 and then assembling it with the metal plate 11.

Figure 6:
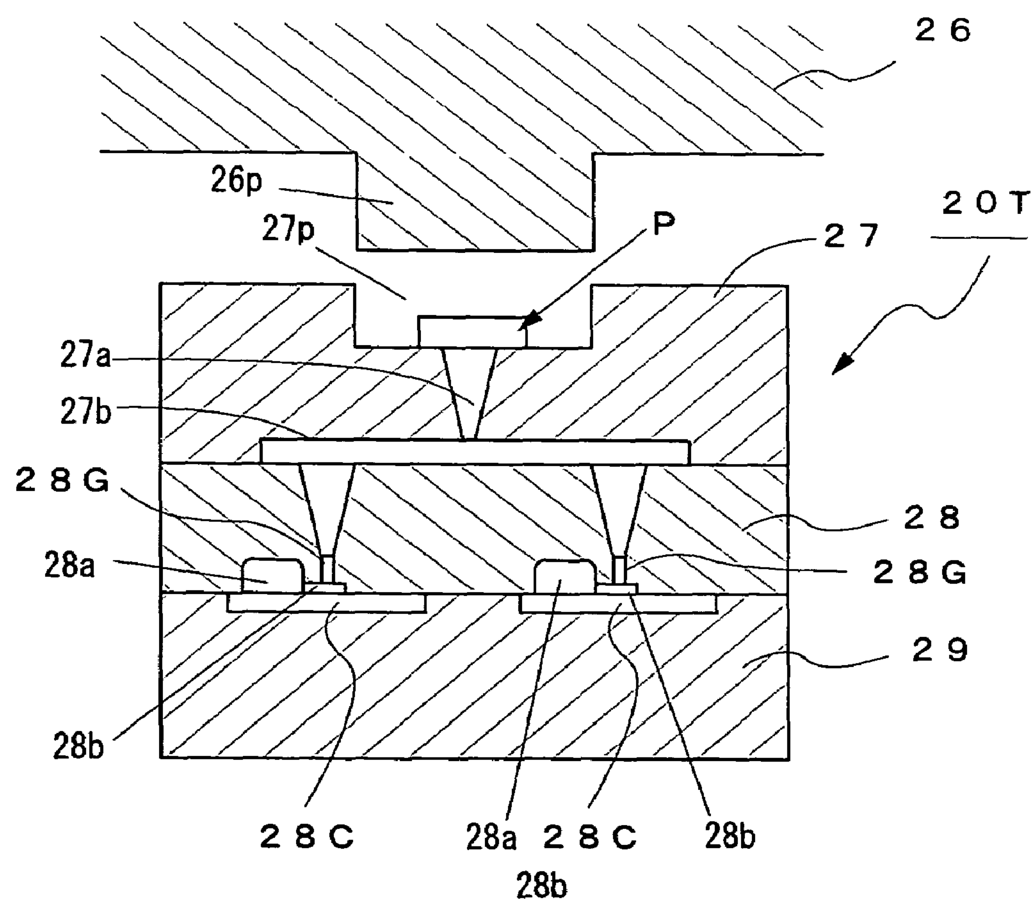
FIG. 6 is a sectional view of a metal mold for the developing blade of the present invention.
Figure 7:
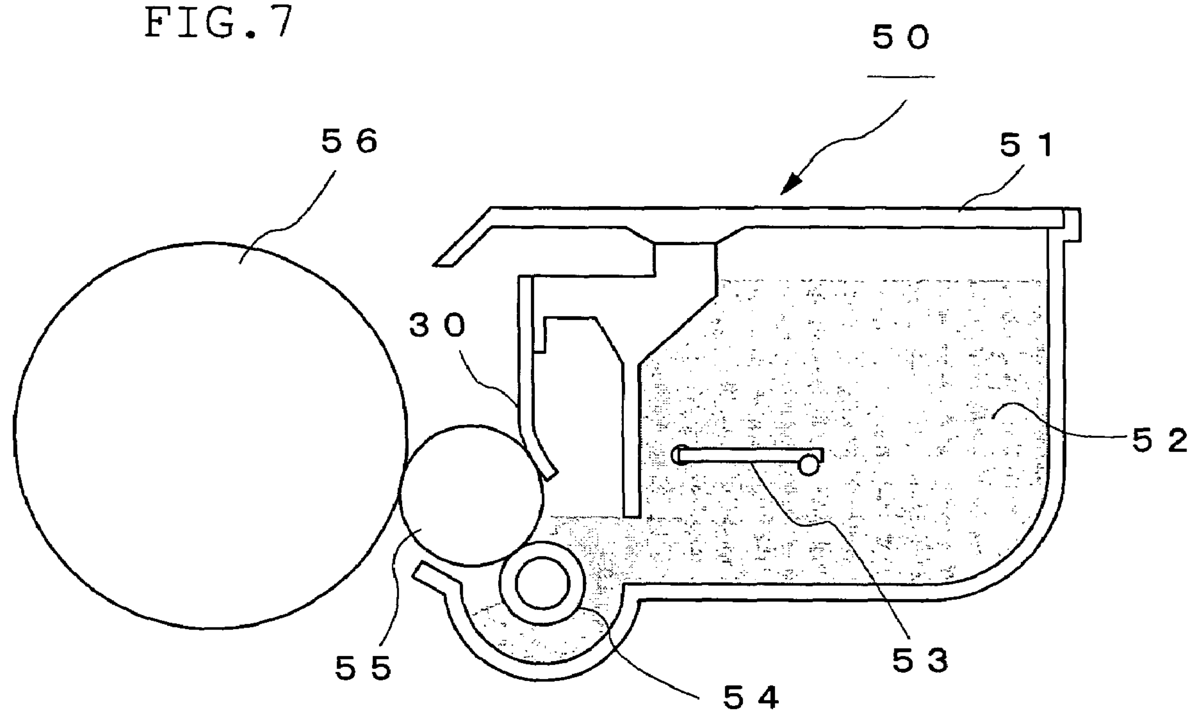
FIG. 7 is a diagram showing a developing device.
Figure 8:
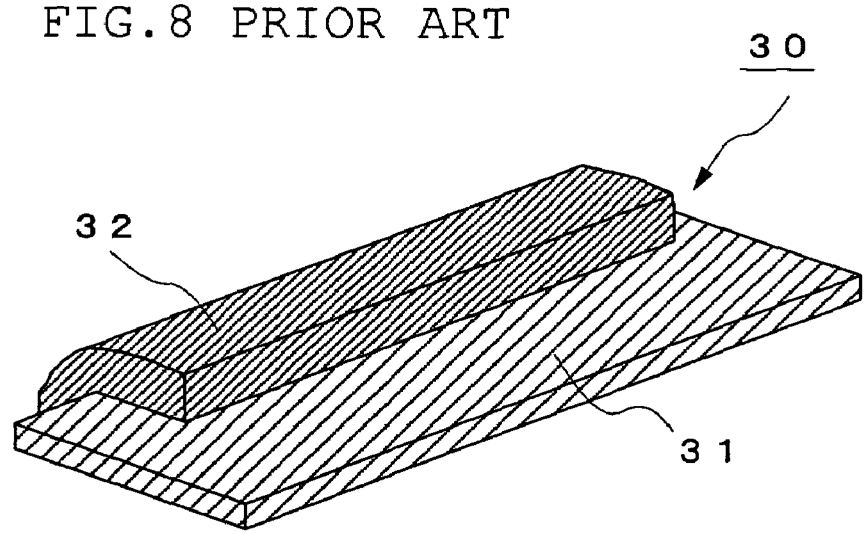
FIG. 8 is a diagram showing an example of a prior art developing blade.

In the above embodiment, the developing blade 10 is injection molded by using the injection metal mold 20. It may be manufactured by transfer molding using a transfer metal mold 20T as shown in FIG. 6. This metal mold 20T comprises a plunger mold 26, a sprue mold 27, a main mold 28 and an insert mold 29. Cavities 28*a* to 28*c* for molding the above blade bodies 12 and the above first and second rib portions 13 and 14 and the gates 28G communicating with the cavities 28*b* corresponding to the above first rib portion 13 are formed in the main mold 28, and recessed portions 28C for storing the metal plate 11 as an insert member are formed in the insert mold 29. To mold the above developing blade 10 by using the above metal mold 20T, the molding material P stored in the recessed portion 27*a* of the sprue mold 27 is injected into the cavities 28*a* to 28*c* of the main mold 28 through the sprue 27*a* and runner 27*b* of the sprue mold 27 by lowering the plunger mold 26. Thereby, the above developing blade 10 can be insert mold.

In the above transfer metal mold 20T, the gate 28G is formed not on the blade body 12 side but the above rib portion 13 side, thereby making it possible to manufacture the developing blade 10 without burrs and recesses on the blade body 12 in contact with the developing roll or without welds surely.

In the above embodiment, the developing blade 10 is manufactured by injection molding. Even in other molding techniques such as casting, a developing blade without burrs and recesses on the blade body 12 can be manufactured by forming the rib portion 13 which projects from the end portion in the longitudinal direction of the blade body 12 in the transverse direction of the above blade body 12, opposite to the above contact surface 12*a* side of the above blade body 12, and casting the molding material from this rib portion 13.

INDUSTRIAL FEASIBILITY

As having been described above, according to the present invention, since a developing blade without burrs and recesses on its contact surface with the developing roll or without welds can be easily manufactured, when this developing blade is used in the developing device of a copier such as a laser printer, the quality of the developing device can be greatly improved.

What is claimed is:

1. A metal mold for molding a developing blade, comprising at least one pair of mold members and a cavity for injection molding a developing blade having a rib portion which projects from an end portion in the longitudinal direction of a blade body in the transverse direction of the blade body, opposite to the contact surface side of the blade body, on the blade body in contact with the developing roll of the developing blade, wherein:

the gate of the metal mold is formed only in a portion corresponding to the rib portion of the cavity, and a thickness of the rib portion is 20% to 80% of a thickness of the blade body.

2. The metal mold for molding a developing blade according to claim 1, wherein the length in the transverse direction of the rib portion is 10 to 200% of the length in the transverse direction of the blade body.

3. The metal mold for molding a developing blade according to claim 1, wherein means for holding an insert member composed of a metal plate is installed in the metal mold.

4. A method for manufacturing a developing blade, the method comprising:

providing a metal mold configured to form a blade body having rib portion which projects in a transverse direction of the blade body from an end portion in the longitudinal direction of the blade body, the rib portion disposed opposite to a contact surface side of the blade body configured to contact with a developing roll, a thickness of the rib portion is 20% to 80% of a thickness of the blade body, the metal mold have a gate formed only in a portion corresponding to the rib portion of the metal mold; and injecting a molding material into the metal mold via the gate.

5. The process for manufacturing a developing blade according to claim 4, wherein an insert member composed of a metal plate is installed in the metal mold to insert mold the developing blade.

6. The method for manufacturing a developing blade according to claim 4, wherein a length in the transverse direction of the rib portion is 10 to 200% of a length of the rib portion in the transverse direction of the blade body.

* * * * *